KUHNS & HAINES.

Grain-Drill.

No. 553. Reissued May 11, 1858.

N. PETERS, PHOTO-LITHOGRAPHER, WASHINGTON, D. C.

UNITED STATES PATENT OFFICE.

B. KUHNS, OF DAYTON, OHIO, AND M. J. HAINES, OF DELAWARE CITY, DEL.

IMPROVEMENT IN SEED-PLANTERS.

Specification forming part of Letters Patent No. 15,810, dated September 30, 1856; Reissue No. 553, dated May 11, 1858.

*To all whom it may concern:*

Be it known that we, B. KUHNS, of Dayton, in the county of Montgomery and State of Ohio, and M. J. HAINES, of Delaware City, in the county of New Castle and State of Delaware, have invented a new and useful Improvement in Seed-Planters; and we do hereby declare that the following is a full, clear, and exact description of the construction and operation of the same, reference being had to the annexed drawings, forming part of this specification, in which—

Figure 1:
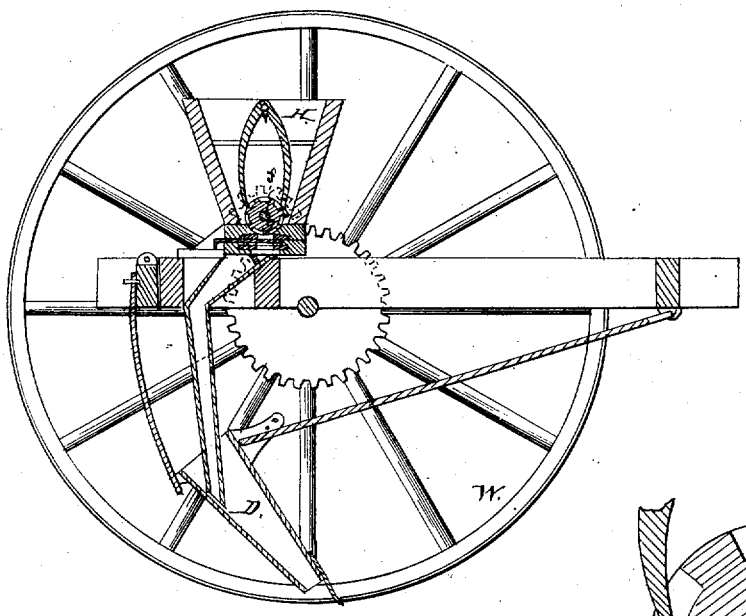
Figure 1:
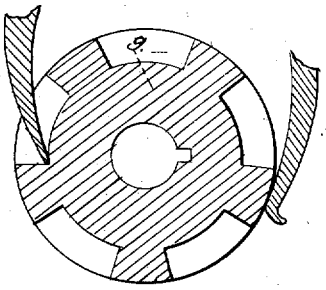
Figure 4:
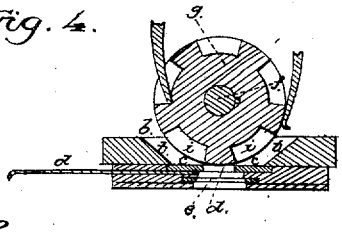
Figure 2:
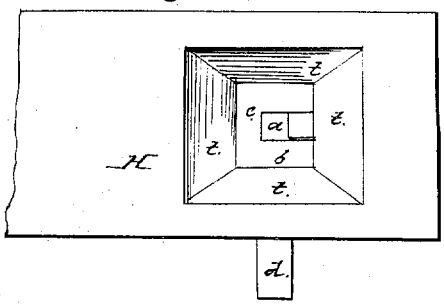
Figure 3:
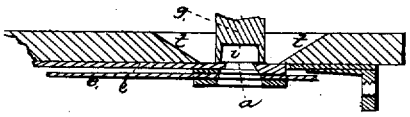

Figure 1 is a vertical section of the machine, taken perpendicular to the axis of the discharging-rollers, through one of the drill-tubes. Fig. 2 is a plan of cell in bottom of hopper. Fig. 3 is a longitudinal section of hopper-bottom, showing cell, discharge-opening, and slides. Fig. 4 is a cross-section of hopper-bottom and feed-roller in position.

Similar characters of reference in the several figures denote the same part.

The invention here considered refers to the seed-discharge of the planters known as "seed-drills," and is designed to render such discharge regular. To do this it is requisite that a uniform supply of seed shall be delivered to the discharging-apertures as the machine moves forward. This we effect by constructing the adjustable discharge-apertures in the bottom of cells having inclined sides, and in placing over each opening and close to the bottom of the cell a roller having pockets in its periphery at regular intervals, which are designed, by the rotation of the wheel or roller, to convey and force through the discharge-opening a certain quantity of grain, the pockets in the roller being wider than the maximum opening in the bottom of the cell, so as always to be adequate to the proper supply of seed, and also that the lateral walls of the pockets may offer sufficient obstruction to the passage of seed from under the side of the roller, the details of construction and operation being as follows:

In the drawings, H is the hopper, having its bottom made up of a series of cells. (Shown in Fig. 2.) D is the drill-tube, and *w* one of the wheels of the machine. In the bottom of each cell *b* is a discharge-opening, *a*, adjustable by means of slide *c*. There are separate cut-off slides *d* under the openings, and also a cut-off, *e*, for stopping the entire discharge. The cells *b* having inclined sides *t*, the seed will have a natural tendency toward the discharge-openings in the bottom. A shaft, *f*, extends through the hopper, upon which are secured (over each discharge-opening) a series of rollers, *g*, each having pockets *i* at regular intervals in the periphery. These pockets are in form as shown in Figs. 4 and 5, their width being greater than the maximum opening of the discharge-apertures. This relation insures a full supply of seed when the apertures are opened to their full extent, and at the same time enables the side walls of the pockets to form barriers to the passage of seed under the side of the roller. These rollers are close to the bottom of the cells, so that no seed can pass from the apertures in the bottom, except what is regularly conveyed to them by the rotation of the said roller. One of the advantages of having the discharge-opening embraced by the cell of the roller, as we propose, is the regularity of discharge which obtains when the machine is operating on inclined ground, the discharge being uniform from all parts of the machine. This result is not attained by any other combination of devices for seed-discharge, as in all other constructions there will be a greater discharge from the lower end of the hopper than from the upper.

The effect of our construction may be stated as follows: A uniform discharge is obtained under all circumstances of adjustment and operation.

We make no claim to the pocketed wheel of itself, nor do we claim the adjustable seed-discharge apertures. We also disclaim the grooved roller shown in Figure 27 and described on page 104 of "Low's Elements of Practical Agriculture;" but What we do claim, and desire to secure by Letters Patent, is—

The pocketed roller, as described, running close to the bottom of the cell, in combination with the adjustable aperture in said cell-bottom, when the relation between the width of the pocket and maximum size of the aperture is such that the pocket will always embrace the aperture, as and for the purposes described.

In testimony whereof we have hereunto signed our names before two subscribing witnesses.

B. KUHNS.
M. J. HAINES.

Witnesses to Kuhns:
GEO. S. BALL,
HENRY BUNDEL.
Witnesses to Haines:
JACOB STANHOPE,
JNO. R. MORRISON.